Figure 3:
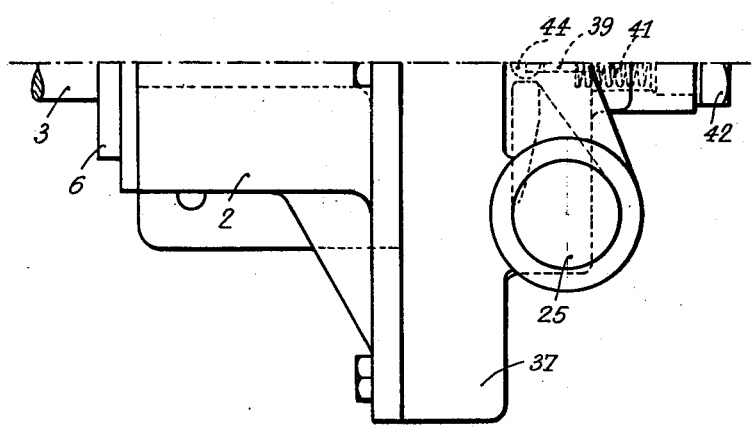

April 28, 1953  A. SALGUES  2,636,444
WOBBLING DISK PUMP
Filed Aug. 10, 1949  2 SHEETS—SHEET 1
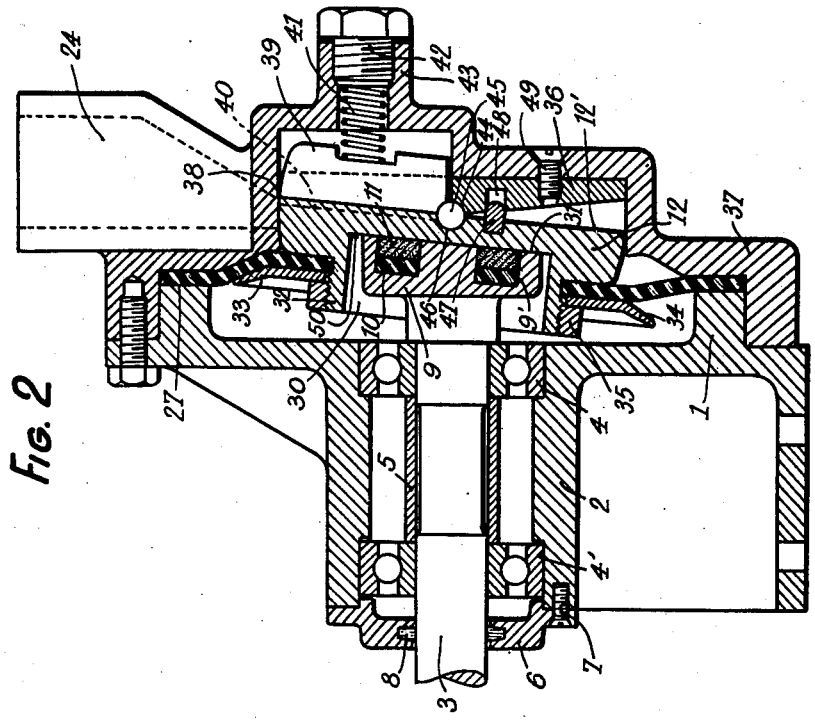
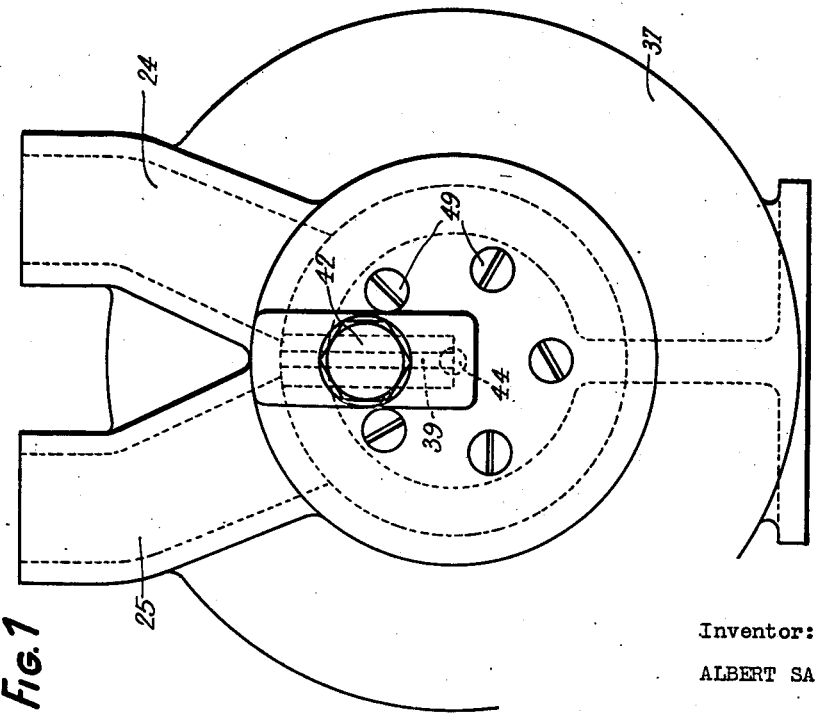
Inventor:
ALBERT SALGUES.

April 28, 1953 A. SALGUES 2,636,444
WOBBLING DISK PUMP

Filed Aug. 10, 1949 2 SHEETS—SHEET 2

Inventor:
ALBERT SALGUES.
Attorney.

Patented Apr. 28, 1953

2,636,444

UNITED STATES PATENT OFFICE 2,636,444

WOBBLING DISK PUMP

Albert Salgues, Paris, France

Application August 10, 1949, Serial No. 109,471

5 Claims. (Cl. 103—133)

This invention relates to pumps and more especially to a pump driven by a rotating member, but requiring neither a stuffing box nor a rotary slide or other valve, the only rotating element being the driving shaft and a head fixed to the shaft and driven by it. These two parts are altogether separated from the pumping mechanism proper and are at no time in contact with the liquid or other fluid conveyed.

Consequently, provided the conveying parts of the pump are made of suitable material, a pump according to this invention is particularly suitable for conveying acids and other corrosive fluids.

Figure 4:
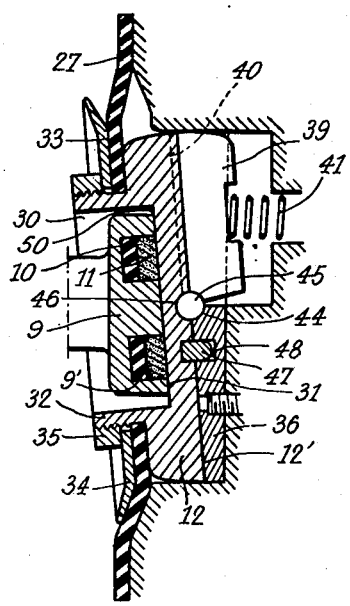

In the drawing affixed to this specification and forming part thereof, an embodiment of the new pump according to this invention is illustrated diagrammatically by way of example. In the drawing:

Fig. 1 is a front view, Fig. 2 an axial section, Fig. 3 a plan view of the intake half and Fig. 4 is a separate axial section of the pumping mechanism and of the two main pumping elements, in a different position of the parts than in Fig. 2.

Referring to the drawing in detail, the pump embodying the present invention is there shown to include a casing 1, which in its rear part forms a bearing sleeve 2 for the driving shaft 3 supported in two ball bearings 4 and 4'. The outer ball race of bearing 4 is fixed in the sleeve 2, while the bearing 4' is held in the sleeve with a slight axial clearance, allowing it to give way to accommodate an elongation of the shaft. The two bearings are held in spaced relation by a tabular spacer 5. A cap 6 is provided covering the bearing sleeve 2 and fixed thereon by means of screws 7. A packing ring 8 in the cap 6 serves to protect the operative portion of the shaft from dust.

On the inner end of the shaft is fixed the driving head 9, a short cylindrical block, the free surface of which extends at an angle, shown here as of 85 degrees to the shaft axis. In the head is formed an annular cavity 9' filled with a rubber ring 10 and a graphite ring 11 whose free surface is flush with the inclined surface of the head 9.

This inclined surface is in permanent contact with the movable pumping element or piston 12, which is a block shaped substantially as a segment of a sphere with a plane active surface 12' corresponding to a diametrical plane of the sphere defining the piston 12. This block is formed with a cylindrical cavity 30 having a plane bottom 31 extending in parallel to the active conveying surface 12' of the piston. A cylindrical flange 32 concentric with the cavity 30 and extending to the rear of the piston carries a pliable membrane 27 made of rubber or the like, fixed in position on the flange 32 by a flat ring 33 formed with a cam face 34 on its border. This ring 33 and the rubber disk 27 are fixed in position on the piston flange by a clamping ring 35 which may be threaded on the flange as shown.

The fixed member of the pumping mechanism proper, which cooperates with the piston 12 in the formation of the pumping chamber, is an element 36 having a flattened conical surface and which is seated in a cylindrical cavity of a casing cover 37 which also carries the pressure and suction conduits 24 and 25 opening into the cavity of the cover at opposite sides of the vertical medial line of the latter. The conical surface of element 36 has an apex angle of 170 degrees. It is formed with a radial slot 38 disposed between the pressure and suction conduits (Fig. 1) and into which extends a flat vane 39 seated in a radial groove 40 of the piston and held therein by a coil spring 41 resting against a screw bolt 42 which closes a hollow boss 43 on the cover. This vane 39 acts as an axially movable partition separating the inner ends of the suction and pressure conduits.

In a hemispherical depression 44 at its apex the conical body 36 holds a ball 45 which also extends into a central hemispherical cavity 46 of the piston surface.

A number of fingers 47 are fixed on the piston 12 and extend from the face 12' of the latter. The fingers 47 are slidably received in depressions 48 formed in the conical face of element 36 which is fixed to the casing cover by means of screws 49.

The shaft head 9 resting with its inclined surface 50 on the bottom 31 of the piston cavity, in being rotated together with the shaft 3, forces the piston body 12 to carry out during one revolution of the shaft a wobbling motion centered in the ball 45 and bringing one radial section of the piston after the other into contact with the corresponding radial sections of the conical surface of the stationary pumping element 36. The piston, without participating in the rotary motion of the shaft head, merely establishes a ring shaped pumping chamber of wedge section between the two confronting faces of the piston 12 and element 36. The fingers 47 resist any tendency on the part of the piston 12 to rotate about its axis, which tendency might otherwise hinder the vane 39 from reciprocating freely in the slot 38 of the element 36.

Since the peripheral portions of the rubber disk 27 are tightly held between the casing 1 and its cover 37, the pumping mechanism and the fluid conveyed by it are altogether separated from the shaft and shaft head and from their bearings.

The vane 39 forming a partition is forced by the spring acting on it to follow the movement of the piston by reciprocating in the slot formed in the conical element 36.

The pumping cycle starts when the piston surface 12 contacts the portion of the conical surface of the element 36 traversed by the slot 38 and the wobbling movement of the piston on the conical surface in creating a suction effect on the suction conduit conveys the fluid around the chamber until it reaches the pressure conduit and is forced into it.

I wish it to be understood that I do not desire to be limited to the exact details of construction shown and described, for obvious modifications will occur to a person skilled in the art.

I claim:

1. A rotary pump comprising, in combination, a casing, an intake and an exhaust port in the wall of said casing, two cooperating pumping elements in a first portion of said casing closely adjoining said ports, one element being fixed in said casing and having a conical surface, the other element being a plane-faced piston member arranged for wobbling motion about the apex of said conical surface and in contact with the latter, rotary driving mechanism in a second portion of said casing and in loose operative contact with the rear face of said piston member and rotatable relative to the latter for effecting said wobbling motion of the piston member, and yieldable partitioning means sealingly extending between the circumference of said piston member and the inner surface of said casing wall and preventing any communication between the first casing portion enclosing said ports and pumping elements and the second casing portion enclosing said driving mechanism.

2. The pump of claim 1, wherein said rotary driving mechanism includes a rotary head having an end face inclined relative to the axis of rotation thereof and said wobbling piston member is a disc formed with a depression facing said rotary head and having a plane bottom, the plane bottom of the depression being parallel to said plane face of said piston member and in permanent sliding contact with said inclined end face of the rotary head.

3. The pump of claim 1, wherein said first portion of the casing defines a cylindrical compartment with said one element therein being disposed coaxial with the axis of said rotary driving mechanism, said wobbling piston member being a spherical segment tangentially engaging the surface of said cylindrical compartment, and universal means seated on the apex of said conical surface and at the center of said plane face of the piston member to permit free rolling movement of the latter about said apex in continuous line contact with the conical surface of said one fixed element.

4. The pump of claim 1, including fingers extending from one of the pumping elements, the other of said elements being formed with recesses arranged to receive said fingers for preventing relative rotation of said elements.

5. In a wobbling disc pump, the combination of a casing, a driving shaft extending into said casing, a head on said shaft having an oblique end face, a portion of said casing defining a cylindrical compartment, a wobbling disc in said compartment formed with a rim of spherical contour effecting sliding tangential contact with the inner surface of said cylindrical compartment, said disc having a central recess formed in one face and having a flat bottom against which said oblique end face of the head effects sliding engagement, the other opposite face of said disc being flat, a stationary element in said compartment having a conical face confronting said flat face of the disc, universal ball means engaging the apex of said conical surface and the center of said flat surface for mounting said disc on said stationary element in a manner permitting wobbling of said disc relative to said stationary element, intake and exhaust ducts opening into said compartment between said disc and stationary element and at circumferentially spaced locations, and means in said compartment separating said intake and exhaust ducts.

ALBERT SALGUES.

References Cited in the file of this patent

UNITED STATES PATENTS

| Number | Name | Date |
|---|---|---|
| 69,401 | Bushnell | Oct. 1, 1867 |
| 535,641 | Thomson | Mar. 12, 1895 |
| 568,642 | Thomson | Sept. 29, 1896 |
| 1,890,612 | Kempthorne | Dec. 13, 1932 |
| 2,015,826 | Vincent | Oct. 1, 1935 |
| 2,107,090 | Swennes | Feb. 1, 1938 |
| 2,496,668 | Manseau | Feb. 7, 1950 |
| 2,559,255 | Manseau | July 3, 1951 |

FOREIGN PATENTS

| Number | Country | Date |
|---|---|---|
| 590,037 | Germany | Dec. 22, 1933 |
| 859,760 | France | Sept. 16, 1940 |